United States Patent [19]
Chester

[11] 3,891,560
[45] June 24, 1975

[54] LARGE SCREEN COLOR DISPLAY

[75] Inventor: Arthur N. Chester, Malibu, Calif.

[73] Assignee: Hughes Aircraft Company, Culver City, Calif.

[22] Filed: Jan. 28, 1974

[21] Appl. No.: 437,421

[52] U.S. Cl. ............ 250/461; 250/474; 250/483; 332/7.51; 358/61
[51] Int. Cl.² .................................. G01N 21/38
[58] Field of Search .......... 250/458, 461, 474, 487, 250/488, 483; 350/150, 154, 320, 153; 358/56, 60, 61; 96/45.1; 117/33.5 CP, 33.5 CM; 332/7.51

[56] References Cited
UNITED STATES PATENTS

| | | | |
|---|---|---|---|
| 2,720,553 | 10/1955 | Toulon | 358/61 |
| 2,802,753 | 8/1957 | Crosby | 250/488 |
| 2,957,940 | 10/1960 | Cusano | 358/60 |
| 3,184,539 | 5/1965 | Thomas | 358/56 |
| 3,303,276 | 2/1967 | Haeff | 358/56 |
| 3,652,956 | 3/1972 | Pinnow et al. | 358/60 |

*Primary Examiner*—Harold A. Dixon
*Attorney, Agent, or Firm*—W. H. MacAllister, Jr.; F. I. Konzem

[57] ABSTRACT

A large screen color display permits a laser scanning system using only a blue and green laser output to produce a display with red, blue, and green primary colors. The large screen display is able to project colors which are not present in the illuminating radiation by using a polarizing screen, with a coating that efficiently scatters blue and green light and a red-emitting, blue-or green-excited phosphor. The coating and the phosphor are located directly behind the polarizing screen. The scattering coating and the phosphor are located so that incident radiation that has one particular plane polarization will only illuminate the scattering coating; and incident radiation with a different, orthogonal plane polarization will only illuminate the phosphor.

9 Claims, 3 Drawing Figures

LARGE SCREEN COLOR DISPLAY

BACKGROUND OF THE INVENTION

1. Field of the Invention

This invention relates to large screen color displays and, more particularly, to a large screen color display in a laser scanning display system which uses only a blue and green laser output to produce a display with red, blue, and green primary colors.

2. Description of the Prior Art

In the art, Bell Laboratories has developed a laser scanning display system which produces an additional color not furnished by the laser by using a phosphor which fluoresces with red light when illuminated with blue light. The phosphor is made into a screen and covered with a liquid crystal film. An electric field on the liquid crystal film makes it reflect blue light with one circular polarization and transmit blue light of the opposite circular polarization. Thus, by changing the polarization of the blue beam, one obtains either reflection of the blue light, or excitation of the phosphor and light emission in the red spectrum. Such a system is described in "The Cholophor: A Passive Polarization Switch Liquid Crystal Screen for Multicolor Laser Displays" in Transactions on Electronic Devices, Vol. 18, No. 9, September 1971, by Frederick J. Kahn and John T. LaMacchia.

However, this liquid crystal screen has several disadvantages. First, techniques for applying liquid crystal films to large areas are not well developed at present. Secondly, the liquid crystal principally reflects the light rather than scattering it, so that the illumination from the screen as a function of angular direction differs for the reflected blue light and for the fluorescing red light. Finally, liquid crystals require application of an electric field for this effect, and have only limited operating lifetimes.

SUMMARY OF THE INVENTION

The large screen color display, in accordance with the invention, consists of a polarizing screen with alternating stripes of which the first transmits radiation polarized in the first direction and the second transmits radiation polarized in the second direction. Behind the stripes on the screen are respectively located stripes of two materials: a blue and green light scattering coating, and a red-emitting, blue-or green-excited phosphor. The scattering coating and the phosphor are located so that incident radiation that has one polarization will illuminate the scattering coating; and incident radiation with the other polarization will illuminate the phosphor.

Accordingly, it is an object of this invention to provide a large screen color display. It is another object to provide a clear plastic base on which a plane polarizing layer can be applied. It is yet another object to provide the plane polarizing layer with alternating vertically and horizontally polarized stripes running from the top to the bottom of the screen. It is still another object to provide a coating that efficiently scatters blue and green light positioned behind the polarizing layer. It is yet another object to provide a red-emitting blue-or green-excited phosphor also behind the polarizing layer.

The features of the present invention which are believed to be novel are set forth with particularity in the appended claims. The present invention, both as to its organization and manner of operation, may be understood best by reference to the following description, taken in connection with the accompanying drawings.

DETAILED DESCRIPTION

Figure 1:
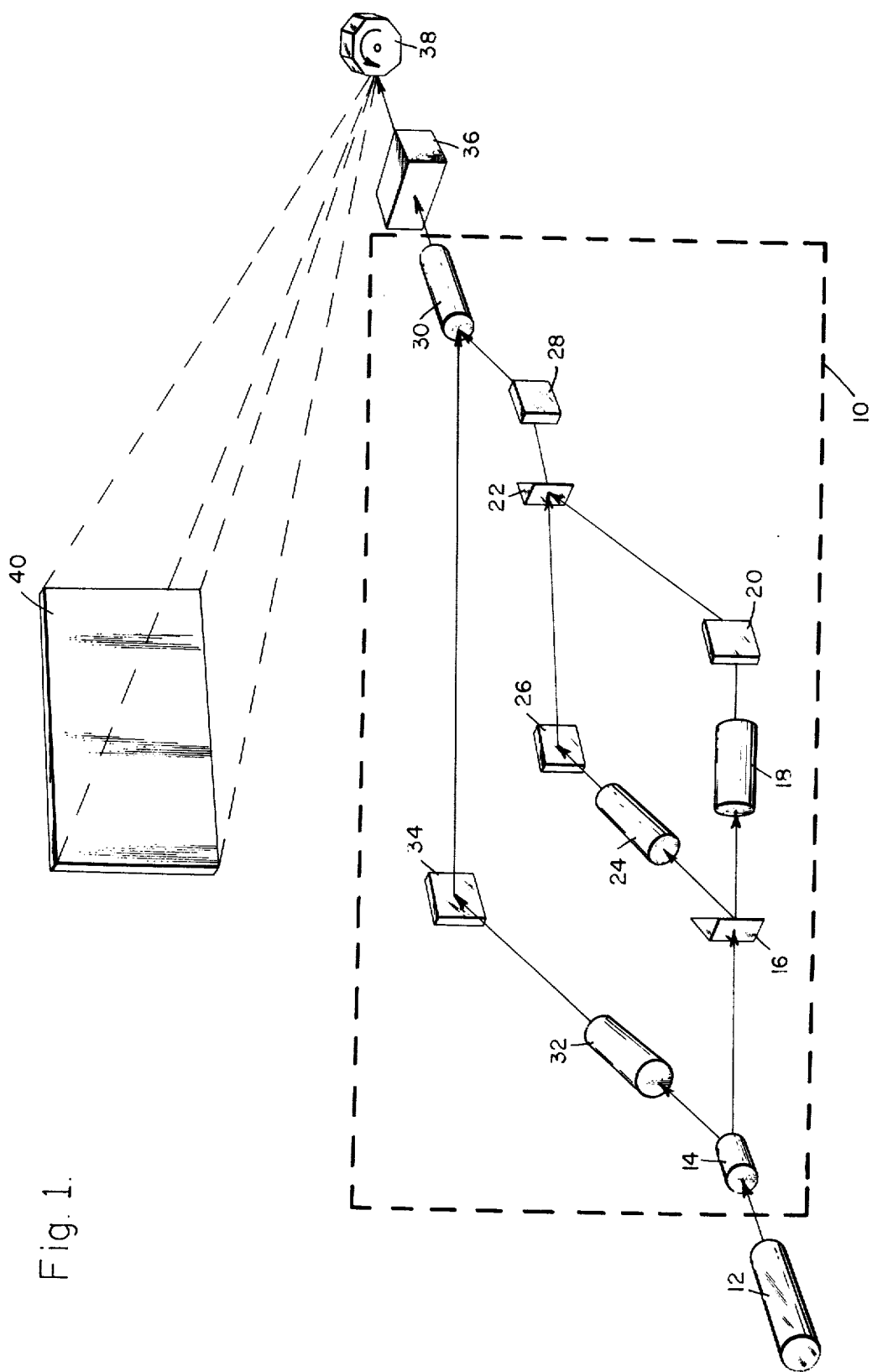
FIG. 1 is a schematic perspective drawing showing the laser modulation and scanning system and the large screen color display.

Referring now to FIG. 1, the laser modulation system 10 and scanning system 36 and 38 which scans the large color screen 40 consists of a conventional argon laser 12 which can produce both a green and a blue laser beam. Both the blue and green beams from the laser 12 are polarized at a 45° angle to the vertical. This laser beam is separated by Wollaston prism 14 into vertical and horizontal components of polarization. The horizontal polarization is separated by prism 16 into blue and green components. The blue component is modulated by the blue modulator 24 and the green component is modulated by the green modulator 18. The blue and green modulated beams are next directed by mirrors 26 and 20 respectively to prism 22, which combines the beams and directs them via mirror 28 to a second Wollaston prism 30. The vertical polarization from Wollaston prism 14 is modulated by red modulator 32 and then directed by means of mirror 34 into Wollaston prism 30. The Wollaston prism combines the beams from mirrors 28 and 34 to form a composite beam, which contains three color information. This composite beam is directed first towards the acousto-optic horizontal line scanner 36. After horizontal scan the beam impinges upon a rotating mirror deflection system, the vertical scanner 38, which produces an enlarged picture on screen 40.

Figure 2:
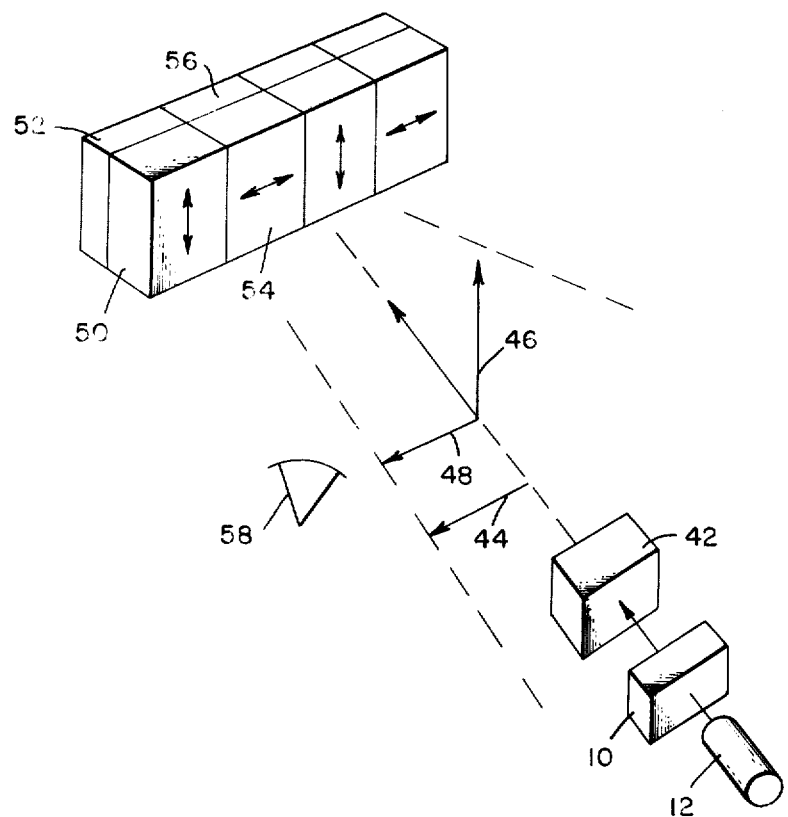
FIG. 2 is an isometric perspective drawing of the large screen color display.

FIG. 2 is a detailed drawing of the large color display screen 40. The modulated beam from the laser modulation system 10 is directed through the scanning optical system 42. This modulated beam carries picture information such that its vertically polarized component 46 has the red component of the picture. The blue spectral portion of the horizontally polarized radiation 48 has the blue picture information, while the green spectral portion of the horizontally polarized radiation 44 carries the green color information.

The large color display screen 40 consists of a thin film of alternating horizontally polarized screen in stripes 54 and vertically polarized screen in stripes 50. In other words half of the stripes transmit vertically polarized visible radiation, and the other half transmit horizontally polarized visible radiation. Behind the polarizing screen consisting of stripes 50 and 54 are located two types of material: a coating 56 that efficiently scatters blue and green light (such as a film of bright white paint), and a red-emitting, blue-or green-excited phosphor 52. The scattering coating 56 and the phosphor 52 are located so that the incident radiation that has one particular plane polarization will only illuminate the scattering coating; and incident radiation with a different, orthogonal plane polarization will only illuminate the red phosphor 52. For an example, each stripe of screen with horizontal polarization 54 might overlay a strip of white paint 56, and each stripe of vertical polarization 50 might overlay a layer of red-emitting phosphor 52. This large color display screen 40 enables the laser to produce an additional color not furnished by the argon laser 12. The three primary colors red, blue, and green can be produced by means of using the single argon laser. By large screen is meant around 15 × 20 feet with 2000 picture resolution elements in each direction, so that a single resolution element is 0.09 × 0.12 inches.

The observer 58 would be positioned anywhere on the same side of the screen 40 as is located the optical system 42.

FIG. 2 is only one example of how the display screen could be constructed. The horizontal and vertical polarization can be interchanged or other directions of polarization can be used (provided that they are orthogonal); or circularly polarizing elements can be used. Also a phosphor may be used which is excited by either blue or green light or both, by modulating one or both colors with the red picture information. Finally, instead of using stripes on the display screen, any division of the screen into two types of regions can be used.

Figure 3:
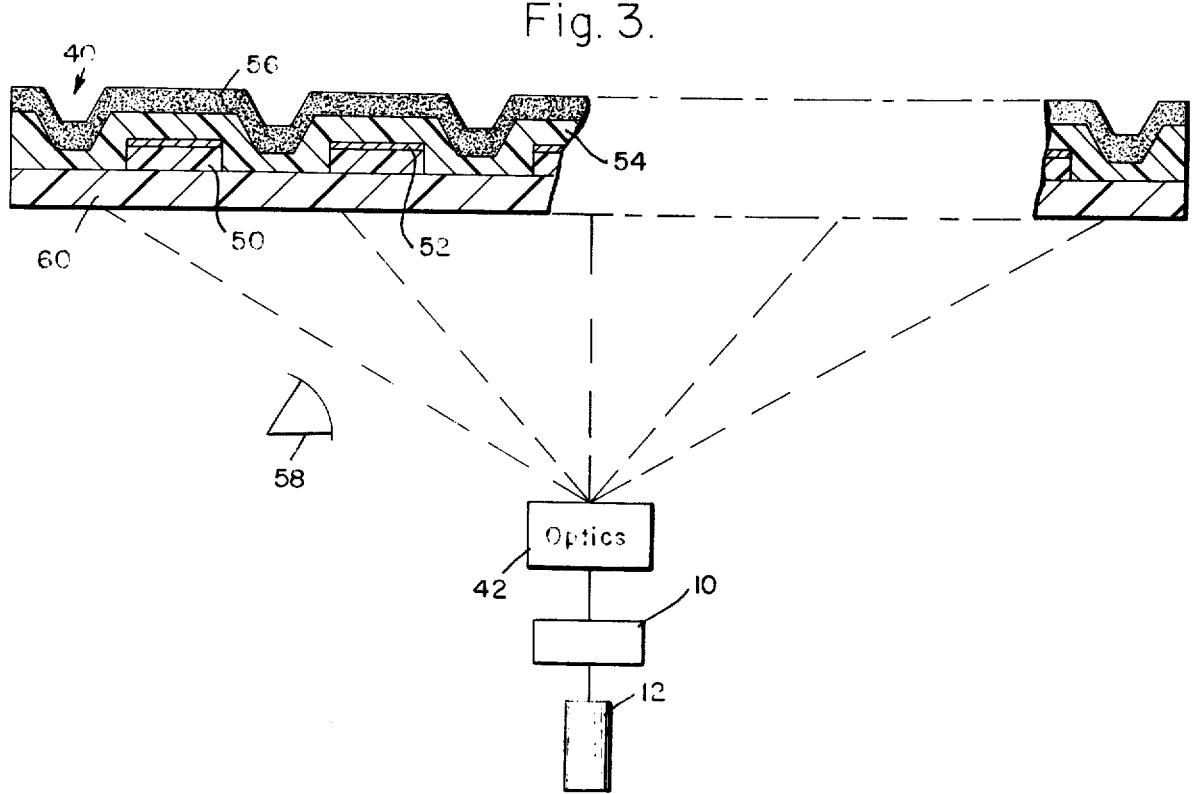
FIG. 3 is a top view of the large screen color display, showing one method of manufacturing the display screen.

FIG. 3 shows a screen structure which can be made by practical technique. Clear plastic base 60 the size of the screen is coated with a plane polarizing layer 50. It is then covered with a red-emitting phosphor layer 52. A photoresist is applied, exposed by conventional optical techniques, and etched, so as to remove areas of both phosphor and polarizing coating in a desired pattern. This partly polarizing screen is now evaporated with another polarizing layer 54 orthogonal to the first (this layer will also overlay the phosphor layer). Finally, an opaque scattering coating of white paint 56 is applied overall.

The advantage of the large color display screen of the invention is that a single argon laser can be used to project the three primary colors, blue, green, and red. This is potentially very useful because efficient and inexpensive red-emitting lasers with sufficient power to illuminate a large screen display have not yet been produced, whereas much more power is available in the blue and green parts of the visible spectrum. Modulation may also be simpler since only two colors must be modulated.

Although the device which has just been described appears to afford the greater advantages for implementing the invention, it will be understood that various modifications thereto without going beyond the scope of the invention, it being possible to replace certain elements by other elements capable of fulfilling the same technical function therein.

What is claimed is:

1. A large screen color laser display comprising:
a screen;
a light source for producing a beam with specific wavelength;
a deflection means for deflecting the beam on said screen;
said screen comprising:
a polarizing layer comprising a plurality of small first areas polarized in a first direction and a plurality of small second areas polarized in a second direction;
said layer consisting of a solid substrate material to which an optical coating is applied;
a scattering coating beneath said first polarizing areas for scattering selected colors; and
a phosphor beneath said second polarizing areas for producing a color of other than said wavelength of said light source.

2. A large screen color laser display for producing a three color display from a two color laser comprising:
a screen comprised of a plurality of small areas;
the first of said small areas being polarized in a first direction; and
the second of said small areas being polarized in a second direction;
said areas consisting of a solid substrate material to which an optical coating is applied;
a scattering coating beneath said first polarizing areas for scattering 2 selected colors; and
a phosphor beneath said second polarizing areas for producing a third color.

3. A large screen color display as recited in claim 2, wherein said substrate material is glass.

4. A large screen color display as recited in claim 2, wherein said substrate material is plastic.

5. A large screen color display as recited in claim 2, wherein said scattering coating is white paint.

6. A large screen color display as recited in claim 2, wherein said phosphor is a red-emitting, blue-excited phosphor.

7. A large screen color display as recited in claim 2, wherein said phosphor is a red-emitting, green-excited phosphor.

8. A large screen color display as recited in claim 2, wherein said phosphor is a red-emitting, blue and green-excited phosphor.

9. A large screen color display comprising:
a laser for producing a beam containing color components;
horizontal and vertical deflection means to enable said laser beam to scan said display;
a clear base;
a plane polarizing layer with alternating stripes of vertical and horizontal polarity running across said screen, said layer being applied to said base;
said layer consisting of a solid substrate material to which an optical coating is applied;
a scattering coating applied to said vertically polarized stripes which is illuminated by vertically polarized components from the laser beam; and
a phosphor applied to said horizontally polarized stripes which is illuminated by horizontally polarized components from the laser beam.

* * * * *